Feb. 7, 1956  K. H. WRIGHT ET AL  2,733,952
CELL CONSTRUCTION FOR TRANSPORTING PRISONERS IN AUTOMOBILES
Filed Sept. 22, 1953

Kenneth H. Wright
Chester C. Baudoin
INVENTORS

BY *Clarence A. O'Brien*
*and Harvey B. Jacobson*
Attorneys

# United States Patent Office 2,733,952
Patented Feb. 7, 1956

2,733,952
CELL CONSTRUCTION FOR TRANSPORTING PRISONERS IN AUTOMOBILES

Kenneth H. Wright and Chester C. Baudoin, Franklin, La.

Application September 22, 1953, Serial No. 381,638

1 Claim. (Cl. 296—24)

The present invention relates to new and useful improvements in attachments for automobiles to confine a person in the rear thereof and without danger of interfering with the driver of the vehicle.

An important object of the invention is to provide a partition positioned transversely of an automobile to extend upwardly from the back of the front seat to the roof of the vehicle and including a shield for the door lock button of the rear door of the vehicle to prevent a person occupying the rear seat from opening the rear door as well as to protect the driver of the vehicle from interference by the occupant of the rear seat.

Another object of this invention is to provide a partition of this character which forms a cell construction in the rear of an automobile and which may be easily and quickly attached in position and removed from the automobile without damaging the finish thereof.

A still further object is to provide a device of this character of simple and practical construction, which is strong and durable, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
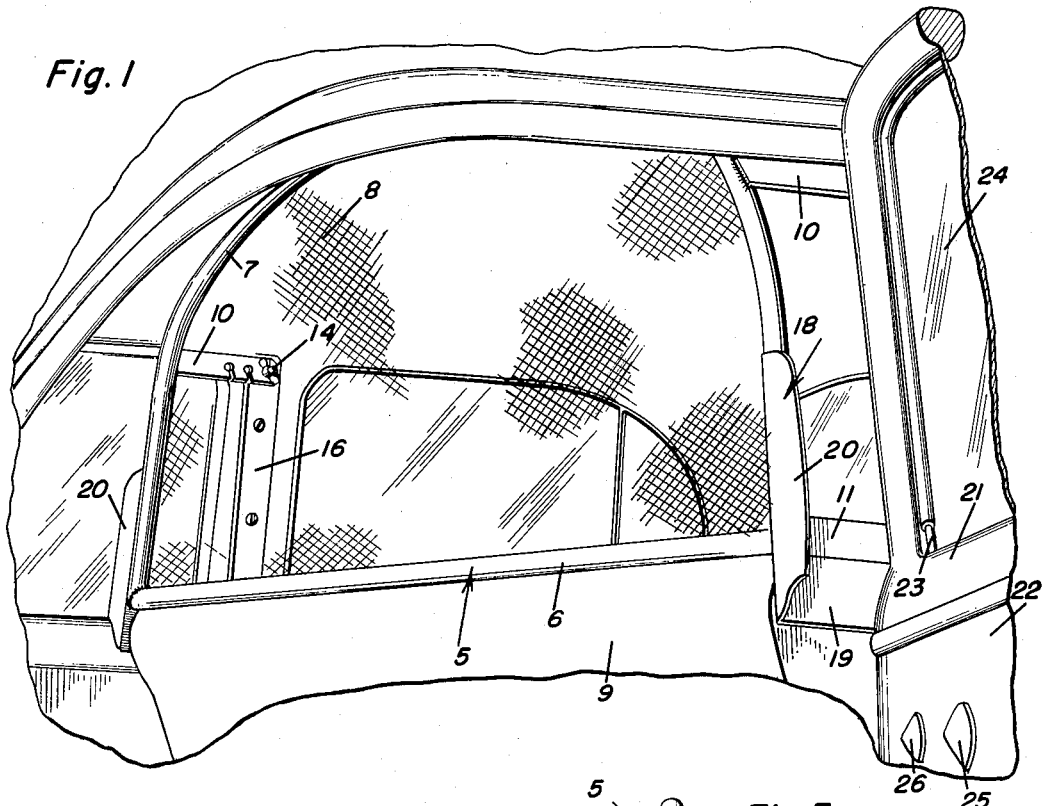
Figure 1 is a perspective view showing the partition attached inside an automobile and with one of the rear doors shown in open position.
Figure 2:
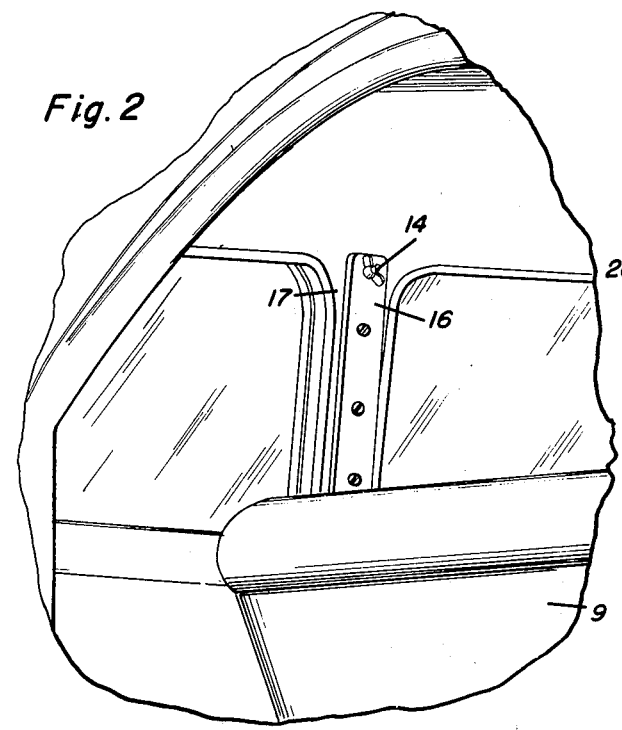
Figure 2 is a perspective view showing one of the attaching plates in position on the door post.
Figure 3:
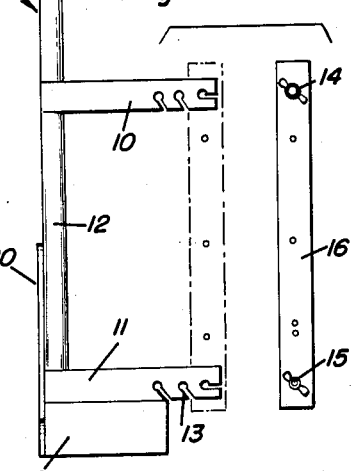
Figure 3 is a group end elevational view of the partition and the attaching plate therefor.

Referring now to the drawing in detail, wherein for the purpose of illustration we have disclosed a preferred embodiment of our invention, the numeral 5 designates the partition generally and which is composed of a lower horizontal frame member 6 preferably constructed of tubular metal and to the ends of which an inverted U-shaped frame member or bow 7, also preferably of tubular metal, is welded. Screening material 8 is secured to the frame members 6 and 7 to provide a partition which is adapted to rest at its lower edge on the top of the front seat line of an automobile to extend transversely of the latter while the inverted U-shaped frame member 7 extends upwardly at the sides of the automobile and closely under the roof thereof.

Upper and lower arms 10 and 11 of strap metal are welded or otherwise suitably secured to the leg portions 12 of the frame member 7 to extend in a forward direction therefrom, and each of the arms is formed with a row or group of keyhole slots 13 adapted to selectively receive upper and lower bolts and wing nuts 14 and 15 attached to a strap metal attaching plate 16 which is secured to the inside of the automobile in a vertical position at each door post 17 thereof. The keyhole slots 13 enable the partition 5 to be adjusted forwardly or rearwardly in the automobile in accordance with variations in the position of the front seat 9 with respect to the door posts.

A metal shield designated generally at 18 is secured to each lower leg portion 12 of the partition and includes a flange 19 which extends downwardly below the lower arm 11, and a wing 20 which projects outwardly beyond the side edges of the partition. The flange 19 is adapted to cover the inside of the lower frame member 21 of the rear door 22 of the automobile in the region of the door lock control button 23 while the wing 20 projects behind the button substantially close to the window 24 to prevent a person occupying the rear seat of the automobile from reaching and manipulating the button 23.

In the operation of the device, the usual rear door handle at the inside of the rear door and the usual crank handle for the rear window (not shown) are removed from the automobile and cover plates 25 and 26 are secured in position in place thereof. Accordingly, with the partition 5 mounted in position at the top of the front seat 9, the partition forms a cell construction for confining a person at the rear of the automobile and without danger of interfering with the driver. When the rear doors are closed, the shield 18 prevents the person in the rear of the automobile from reaching the door lock button 23 to open the door.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In combination with an automobile having a front seat for the driver and a rear passenger compartment provided with doors having door lock actuating buttons, a partition on top of the front seat and enclosing the rear compartment, an attaching member at each end of the partition, and a shield at each end of the partition enclosing the door buttons, said shield including a downwardly projecting flange abutting the door below an adjacent door button and an outwardly projecting wing positioned behind the button to enclose the latter.

References Cited in the file of this patent
UNITED STATES PATENTS

| | | |
|---|---|---|
| 1,412,474 | Lillie | Apr. 11, 1922 |
| 1,481,548 | Gongaware | Jan. 24, 1924 |
| 2,219,412 | Dean | Oct. 29, 1940 |
| 2,314,419 | Olson | Mar. 23, 1943 |
| 2,560,106 | Held | July 10, 1951 |